United States Patent [19]

Cheatum

[11] 3,924,391

[45] Dec. 9, 1975

[54] ADJUSTABLE CROP COMPRESSOR FOR A PICKUP MECHANISM

[75] Inventor: Leo George Cheatum, Ottumwa, Iowa

[73] Assignee: Deere & Company, Moline, Ill.

[22] Filed: Mar. 3, 1975

[21] Appl. No.: 554,636

[52] U.S. Cl. .............................. 56/364; 56/341 X
[51] Int. Cl.² ....................................... A01D 89/00
[58] Field of Search .............. 56/341, 342, 343, 364

[56] References Cited
UNITED STATES PATENTS

| | | | |
|---|---|---|---|
| 2,571,489 | 10/1951 | Russell | 56/341 X |
| 2,647,355 | 8/1953 | Luke | 56/343 |
| 2,691,266 | 10/1954 | Meyer et al. | 56/364 |
| 2,796,722 | 6/1957 | Hanford et al. | 56/364 |
| 2,872,772 | 2/1959 | Nolt | 56/364 |
| 2,975,581 | 3/1961 | Matthies | 56/341 |

*Primary Examiner*—Russell R. Kinsey

[57] ABSTRACT

A pull-type baler has a rotary, finger-type pickup mechanism that elevates crop from a window as the machine advances to a horizontal deck from which it is fed into a baling chamber. An improved crop compressor is mounted above the pickup mechanism for restraining the upward movement of the crop material as it is being picked up, the crop compressor including a transverse support member above the pickup. A pair of parallel, laterally spaced arm are swingably mounted on the support member and rotatably carry a transverse bar from which a plurality of side by side downwardly and rearwardly curved compressor tines extend in cantilever fashion, the rearward ends of the tines being disposed opposite to and above the deck. The angular position of the arms about the support member is selectively adjustable to vary the heighth of the bar, and the angular position of the bar relative to the arms is in turn controlled by a crank arm attached to one end of the bar and connected to the support structure by an adjustable link, so that as the angled position of the arm is adjusted to vary the clearance between tines and the deck, the angular position of the bars can be simultaneously adjusted to maintain the desired angular position of the tines.

6 Claims, 3 Drawing Figures

ADJUSTABLE CROP COMPRESSOR FOR A PICKUP MECHANISM

BACKGROUND OF THE INVENTION

This invention relates to a crop compressor or hold-down device that is used in conjunction with a crop pickup mechanism.

It is known to provide a device for holding down or vertically compressing the crop as it is being picked up from the field by a pickup mechanism, such devices being frequently provided on harvesting machines such as balers. Conventionally, the pickup mechanism on balers or the like have utilized a rotor with a plurality of radial fingers that engage the crop and move it upwardly and rearwardly onto a generally horizontal deck, and the compressor devices have generally comprised a plurality of fore and aft fingers disposed above the deck, the crop being delivered rearwardly between the fingers and the deck. The compressor fingers ensure a smooth even feeding of the crop material from the pickup mechanism to the feeding system on machine and further prevent the wind loss of material as it is being picked up. The compressor fingers or tines have conventionally extended rearwardly in cantilever fashion from a transverse support member above and forwardly of the pick-up mechanism, and in some cases the support member has been freely rotatable to accommodate different thickness of the matted material being picked up by the pickup mechanism. In other cases, where the compressor tines have been rigidly mounted on the transverse support member, means have been provided for adjusting the angular position of the support member to vary the angle of the compressor tines and consequently the clearance between the deck and the tines.

SUMMARY OF THE INVENTION

According to the present invention, improved means are provided for mounting compressor tines or fingers on a harvesting machine, such as a baler or the like, having a pickup mechanism. More specifically, improved means are provided for adjusting the compressor tines to vary the clearance between the pickup mechanism deck and the tines.

An important feature of the invention resides in the fact that the compressor tines can be adjusted to vary the clearance between the tines and the pickup mechanism while maintaining a relatively constant angular position of the support on which the tines are mounted, so that the compressor tines are disposed in the optimum attitude regardless of the height of adjustment of the tines.

Another feature of the invention resides in the simple and rugged construction of the adjusting mechanism, which is also simple and easy to adjust.

Still another feature of the invention resides in the provision of means for mounting the compressor tines so that the compressor tines can easily be swung out of the way of the pickup mechanism to improve the service access to the pickup mechanism in the harvesting machine components rearwardly of the pickup mechanism.

DESCRIPTION OF THE PREFERRED EMBODIMENT

Figure 1:
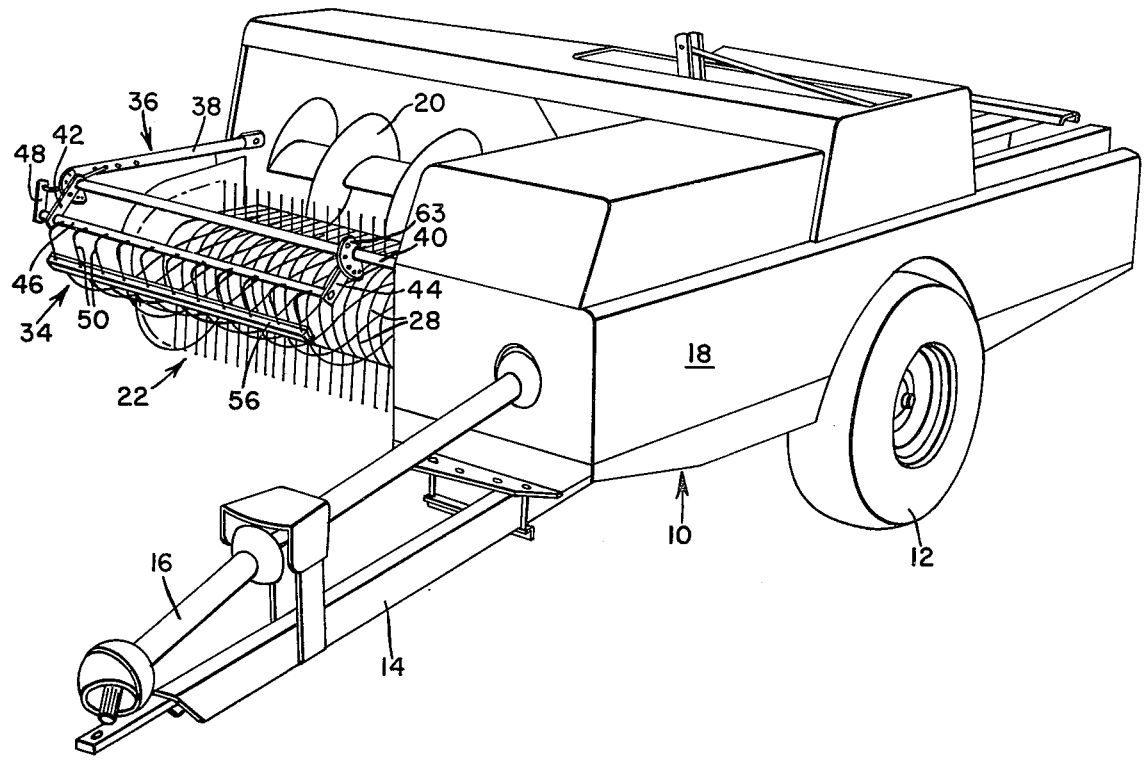
FIG. 1 is a left front perspective view of a baler including the improved adjustable compressor device above the pickup mechanism.

The invention is embodied in a pull-type baler having a main frame, indicated generally by the numeral 10. The baler is mounted on a pair of wheels 12, only the left hand wheel being shown in FIG. 1, and is connectible to the towing vehicle, conventionally an agricultural tractor, by a fore and aft draft member 14. A fore and aft drive shaft 16 powers the baler, the forward end of the drive shaft being connectible to a rearward powered take-off on the tractor in the conventional manner. The baler includes a fore and aft bale case 18 at the left side of the machine and a transverse auger 20 that receives the crop material from a pickup mechanism 22 at the right side of the machine and delivers it laterally to the baling chamber.

The pickup mechanism is of well known construction and includes a rotor 24 with a plurality of generally radially extending spring loaded fingers 26, a similar pickup mechanism being described in greater detail in U.S. Pat. No. 3,613,345, also assigned to the assignee herein. The pickup fingers 26 rotate in a counterclockwise direction, as viewed in FIG. 2, and move in fore and aft slots or spaces 28 between adjacent strippers 30. Each stripper has a generally semi-circular forward portion 31 concentric with the pickup rotor 24 and a generally horizontal rearward deck portion 32 that extends tangentially rearwardly from the upper end of the forward portion 31. The deck portion 32 merges into a horizontal floor that extends rearwardly below the auger 20, in the well known manner. The rearward or deck portions of the stripper are interconnected to form a horizontal deck immediately to the rear and above the pickup rotor, and as the baler advances, the crop material lying in a windrow is engaged by the pickup fingers as they are moving forwardly and upwardly, whereeupon the fingers elevate the crop and project it rearwardly upon the deck formed by the interconnected deck portions of the strippers 30. As is well known, the pickup fingers are deflected as they are engaged by the deck and as the fingers move downwardly in the slots between the strippers, the crop material is stripped from the fingers.

A crop compressor or hold-down device 34 is mounted on the baler immediately above the pick-up mechanism 22 and includes a horizontal L-shaped support 36 having a fore and aft member 38 attached to and extending forwardly from the right side of the baler and a transverse support member 40 extending between the forward end of the fore and aft member 38 and the right side of the bale case. As is apparent, the transverse support member 40 is disposed above and forwardly of the pickup mechanism 22. A pair of parallel arms 42 and 44 are respectively pivotally mounted on the transverse member 40 and rotatably support a transverse bar 46, and is parallel to the transverse member 40. As shown in FIG. 1, the arms 42 and 44 are in general alignment with the opposite sides of the pickup mechanism and the bar 46 spans the width between the arms 42 and 44, with the right end of the bar 46 extending a short distance beyond the right arm 42 and being provided with a radial crank arm 48.

A plurality of generally fore and aft compressor fingers or tines 50 are rigidly mounted in the bar 46, the compressor tines 50 being identical and being mounted side by side along the substantial length of the bar 46. Each tine 50 has a threaded upper end 52 that extends through a diametral bore through the bar 46 and is secured therein by a nut type fastener 54, so that the tine is rigid with the bar. The tines extend forwardly from the bar 46 but curve immediately downwardly and rearwardly, and a transverse tie bar 56 interconnects the tines 50 a short distance below the mounting bar 46 to ensure the proper spacing of the tines. Each tine 50 includes an arcuate portion 58 below the tie bar and generally forwardly of the pickup mechanism and a generally horizontal rear portion 60 extending tangentially from the curved portion 58, the rear portion normally being disposed above and approximately parallel to the rearward deck portion 32 of the strippers 30.

A pair of upright fore and aft locking member 62 and 63, generally in the shape of a segment of a circle, are attached to the transverse support member 40 adjacent the arms 42 and 44, and each locking member is provided with a series of transverse holes 64 that are offset equal radial distances from the pivot axis of the arms 42 and 44. A transverse locking pin 66 removably extends through each arm 42 or 44 and one of the holes 64 in the adjacent locking member 62 or 63 to lock the arm in a selected angular position about its pivot axis on the transverse support member 40. The locking pin is preferably easily removable and can be provided by a bolt and nut type fastener or can be maintained in the respective holes by means of a conventional cotter pin. A generally fore and aft link 68 has a transverse portion at its rearward end that extends through one of four alternate diametral holes 70 in the fore and aft support 38, the link being removably mounted in a selected hole 70 and retained therein by a conventional cotter pin 72. The forward end of the link 68 is provided with a similar transverse portion and extends through a hole at the upper end of the crank arm 48, the link being similarly removably secured in the crank arm by a cotter pin 73 or the like.

Figure 2:
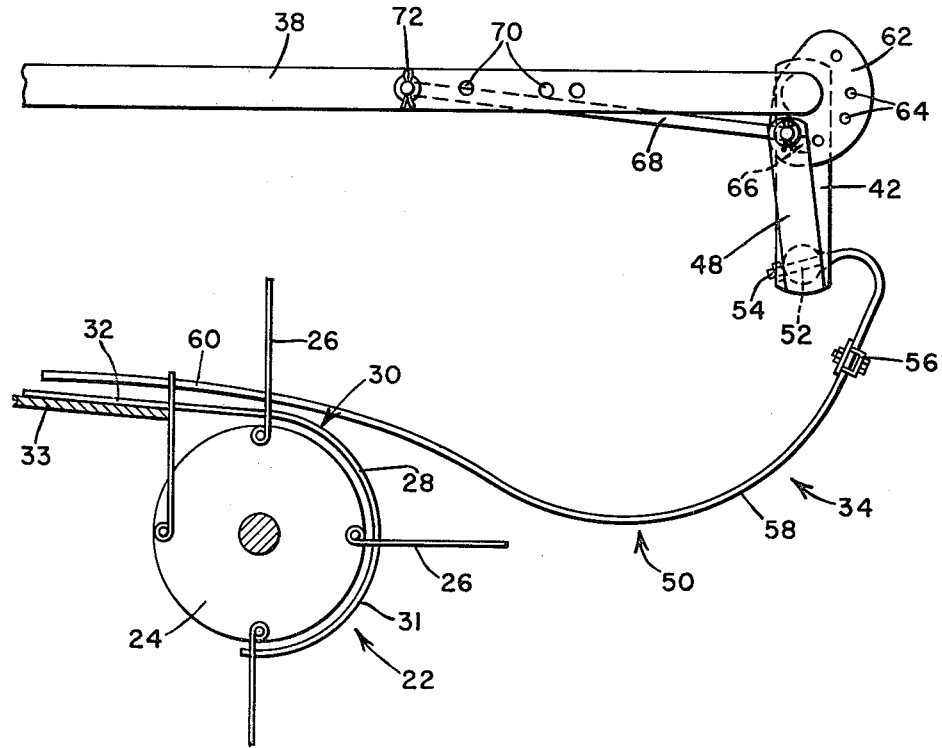
FIG. 2 is an enlarged side elevation view, with parts shown in section, of the forward end of the pickup mechanism and the compressor device, showing the compressor tines in their lowermost position.

In operation, when the windrow of hay or straw that is being picked up by the pickup mechanism is small, the compressor is adjusted to the position shown in FIG. 2, wherein the rear portion 60 of the compressor tines 50 are disposed immediately above the deck portions 32 of the strippers. To increase the clearance between the compressor tines and the strippers, which would be desirable when the windrow is somewhat larger, the locking pins 66 are removed from the opposite arms 42 and 44 and the rearward end of the link 68 is removed from the rearmost hole 70 in the support member 38, whereupon the arms are swung forwardly until the holes in the arms are aligned with the second set of holes from the bottom in the respective locking members 62 and 63, the pins 66 being reinserted. The rearward end of the link 68 is then inserted through the second hole from the rear and again locked in place. For larger windrows yet the tines can be adjusted for greater clearance in increments by locking the arms 42 and 44 in the third or fourth hole from the bottom and moving the rearward end of the link 68 to the corresponding third or fourth hole 70 from the rear. The forward portion of the fore and aft support member 38, the link 68, the crank arm 48, and the arm 42 act as a four bar linkage that maintains the tines 50 in a generally constant rotational position relative to the axis of the bar 46, so that the inclination or attitude of the rearward portion of the tines stays relatively horizontal, which is the optimum position.

Figure 3:
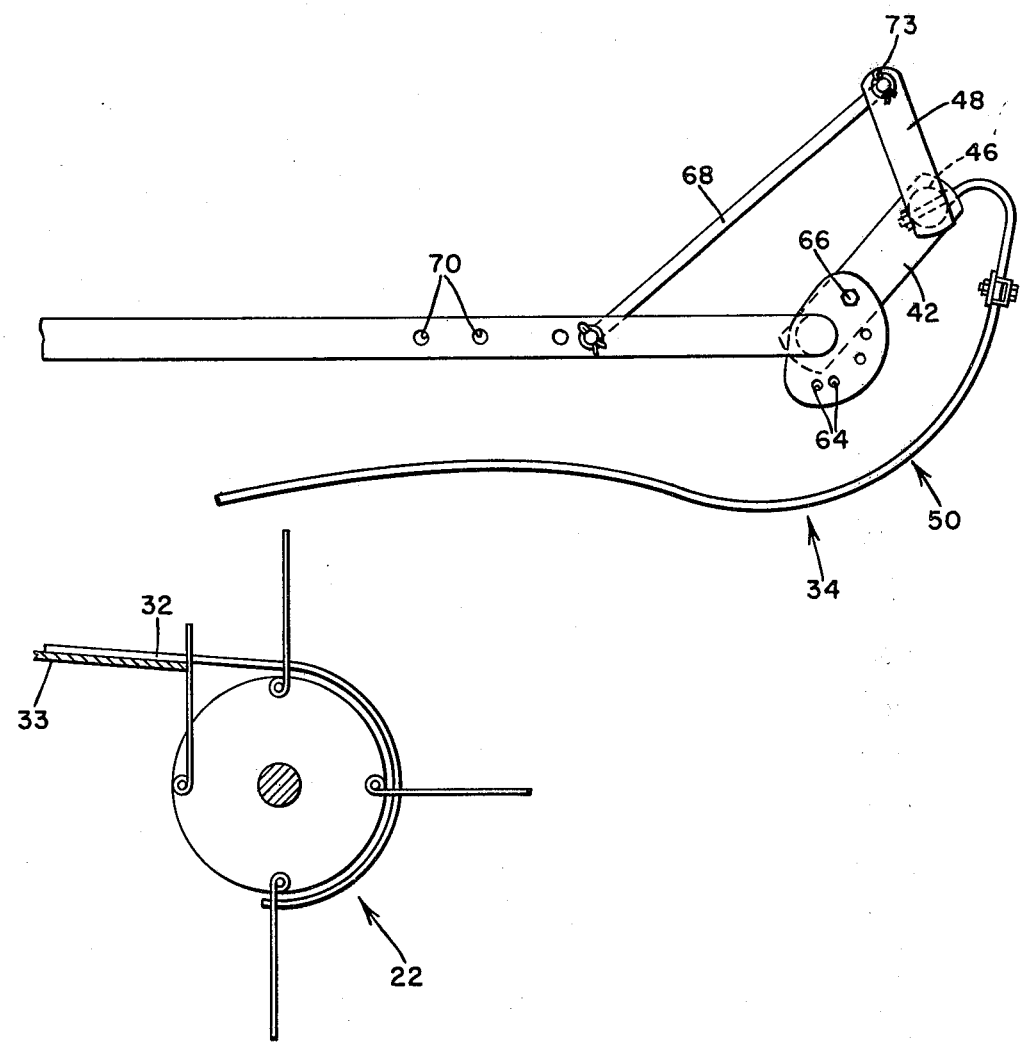
FIG. 3 is a view similar to FIG. 2, but showing the compressor tines adjusted into their uppermost position for maximum clearance between the pickup mechanism and the compressor tines.

If the windrows are very large or bunched, and maximum clearance is desired, the arms 42 and 44 can be adjusted to their uppermost position, as shown in FIG. 3. When adjusted to the upper position, there is a slight change in inclination of the fingers 50, since the rearward end of the link 68 is maintained in the forwardmost hole 70 for both the fourth and fifth positions of the arm 42, although obviously, an additional hole could be provided if it was desired to still maintain the same attitude of the fingers. Also, different combination of holes 70 and 64 could be used to provide different inclinations of the tines.

To provide for easier access to the pickup mechanism or the other feeding components, either end of the link 68 can be disconnected, whereby the bar 46 and the compressor tines carried thereby can be freely rotated, so that the compressor tines can be rotated upwardly and forwardly to permit access to the baler components from above. For adequate rotation of the compressor fingers, it might be necessary to adjust the arms 42 and 44 to a lower positions if they are in one of the upper positions, to provide adequate rotation of the compressor fingers.

I claim:

1. In a harvesting machine having a rotary pickup mechanism with a plurality of pickup elements adapted to raise crop material from a field as the machine advances and deliver it rearwardly onto a generally horizontal deck, the combination therewith of an improved crop compressor device for restraining the upward movement of the crop material as it is raised by the pickup mechanism and comprising; a supporting structure mounted on the harvesting machine and including a support member above the pickup mechanism; a pair of parallel support arms swingably mounted on the support member for swinging about a transverse axis; a transverse bar extending between and journaled in the support arms parallel to the pivot axis of the arms; a plurality of compressor tines mounted on and depending from the bar and including cantilevered, generally horizontal rearward portions disposed above the deck and resiliently deflectable upwardly to permit the rearward passage of crop material between the deck and the compressor tines, the tines engaging the crop material from above to compress the crop material downwardly toward the deck; means for adjustably positioning the arms in different angular positions about the transverse support member to selectively vary the position of the bar relative to the pickup mechanism; crank arm means connected to the bar; and linkage means interconnecting the crank arm means and the supporting structure to control the angular position of the bar in the support arms and thereby control the attitude of the compressor tines relative to the pickup mechanism.

2. The invention defined in claim 1 wherein the means for adjustably positioning the arms includes an upright, fore and aft locking member mounted on the support member adjacent at least one of said arms and having a plurality of transverse holes offset equidistantly from the pivot axis of the arms and a locking element insertable through the adjacent arm and one of the holes to lock the arm to the locking member.

3. The invention defined in claim 1 wherein the linkage means includes a generally fore and aft bar having its forward end connected to the crank arm offset from the bar and its rearward end selectively connectible to the supporting structure at alternate mounting points by removable mounting means.

4. The invention defined in claim 2 wherein the linkage means includes a generally fore and aft bar having its forward end connected to the crank arm offset from the bar and its rearward end selectively connectible to the supporting structure at alternate mounting points by removable mounting means.

5. The invention defined in claim 4 wherein the supporting structure includes a fore and aft member extending forwardly from the harvesting machine above one lateral side of the pickup mechanism, the support member comprising a transverse tube connected to the forward end of the fore and aft member, the alternate mounting points for the linkage being disposed on the fore and aft member.

6. The invention defined in claim 5 wherein the crank arm is mounted on one end of the transverse bar adjacent to the fore and aft supporting structure member.

* * * * *